United States Patent
Barter et al.

(10) Patent No.: US 9,190,675 B2
(45) Date of Patent: Nov. 17, 2015

(54) HUMID STREAM ORIFICE VIA GEOMETRY AND MATERIAL THAT IS ROBUST TO BECOMING BLOCKED

(71) Applicant: GM Global Technology Operations LLC, Detroit, MI (US)

(72) Inventors: Stuart D. Barter, Lima, NY (US); Jon P. Owejan, Honeoye, NY (US); Christopher J. Towner, Hamlin, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 13/887,428

(22) Filed: May 6, 2013

(65) Prior Publication Data
US 2013/0295479 A1 Nov. 7, 2013

Related U.S. Application Data

(60) Provisional application No. 61/643,559, filed on May 7, 2012.

(51) Int. Cl.
| | |
|---|---|
| H01M 8/04 | (2006.01) |
| H01M 2/38 | (2006.01) |
| H01M 2/40 | (2006.01) |
| H01M 8/24 | (2006.01) |
| F16K 31/06 | (2006.01) |

(52) U.S. Cl.
CPC ....... H01M 8/04089 (2013.01); F16K 31/0672 (2013.01); H01M 8/04223 (2013.01); H01M 8/04253 (2013.01); H01M 8/04268 (2013.01); H01M 2250/20 (2013.01); Y02E 60/50 (2013.01); Y02T 90/32 (2013.01)

(58) Field of Classification Search
USPC ................. 429/433, 428, 429, 434, 447, 455
IPC ..................... H01M 8/04223,8/04253, 8/04268
See application file for complete search history.

(56) References Cited

U.S. PATENT DOCUMENTS

| | | | | |
|---|---|---|---|---|
| 6,763,849 B2 * | 7/2004 | Sugiura et al. | ................ | 137/375 |
| 8,192,881 B2 * | 6/2012 | Kirklin et al. | ................. | 429/433 |

* cited by examiner

*Primary Examiner* — Patrick Ryan
*Assistant Examiner* — Julian Anthony
(74) *Attorney, Agent, or Firm* — Dinsmore & Shohl LLP

(57) ABSTRACT

A component for reducing the likelihood of ice-related blockage in a fuel cell and methods for starting a fuel cell system. In one embodiment, the component is a separate insert configured with a sharp leading edge such that water droplets present in a reactant fluid that pass through an orifice in the component are conveyed away from an unstable formation at the edge to a more stable formation in an adjacent part of the component. In one form, the component is sized to fit within a valve inlet that in turn is placed in a humid reactant flowpath. In this way, when the fuel cell is operated in cold conditions—such as those associated with temperatures at or below the freezing point of water—the water droplets do not freeze in the area around the orifice such that ice-related blockage of the flowpath does not occur.

20 Claims, 3 Drawing Sheets

HUMID STREAM ORIFICE VIA GEOMETRY AND MATERIAL THAT IS ROBUST TO BECOMING BLOCKED

This application claims priority to U.S. Provisional Application 61/643,559, filed May 7, 2012.

BACKGROUND OF THE INVENTION

This invention relates generally to fuel cells, and more particularly to a humid stream orifice design that does not become blocked under freezing conditions, as well as methods of fuel cell system start-up under frozen conditions such that blockage due to ice formation is inhibited.

Fuel cells convert a fuel into usable electricity via electrochemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell—such as a proton exchange membrane or polymer electrolyte membrane (in either event, PEM) fuel cell—a pair of catalyzed electrodes are separated by an ion-transmissive medium (such as Nafion™). The electrochemical reaction occurs when a gaseous reducing agent (such as hydrogen, $H_2$) is introduced to and ionized at the anode and then made to pass through the ion-transmissive medium such that it combines with a gaseous oxidizing agent (such as oxygen, $O_2$) that has been introduced through the other electrode (the cathode); this combination of reactants form water as a benign byproduct. The electrons that were liberated in the ionization of the hydrogen proceed in the form of direct current (DC) to the cathode via external circuit that typically includes a load where useful work may be performed. The power generation produced by this flow of DC electricity can be increased by combining numerous such cells to form a fuel cell stack or related assembly that makes up a fuel cell system.

Various fuel cell system operating conditions can lead to a high water content in one or both of the reactant streams. For example, water generated during operation of the fuel cell system may build up in one or both of the anode stream and cathode stream. In certain operating conditions, it is desirable to remove excess moisture to ensure that ice blockage of key flowpaths is avoided in conditions where such water may be exposed to freezing temperatures or related environmental conditions. Removing water from the fuel cell's anode loop is especially difficult as it doesn't have the high volume and velocity gas flow motive force that the cathode loop does as a way to purge any excess water. As such, starting a vehicular fuel cell system that has moisture present in one or both of the reactant fluid streams is hampered under cold ambient conditions if the low temperatures lead to ice or related blockage of the passageways that normally convey reactant to or from the fuel cells or stack. If a flowpath leading to the anode is blocked with ice, the flow of $H_2$ to the stack is prevented, which in turn leads to a failed cold catalytic heating (CCH) event, and the consequent failure of the vehicle to start.

One way to promote heating within a fuel cell after a period of rest is known as cold catalytic stack heating (CCSH). This approach allows the flow of hydrogen from the anode to the cathode as a way to promote heating during fuel cell cold starts. For the cold start to be successful, flow of hydrogen must occur within two seconds of start. If the orifice in the valve is blocked with ice, CCSH will not occur and the cold start is aborted. Supplemental energy devices (including those capable of imparting heat or vibration to at-risk components) may be also employed to reduce the likelihood of ice-related blockage to fuel cell components. Nevertheless, such measures significantly increase the cost and complexity of the overall fuel cell system.

SUMMARY OF THE INVENTION

The present invention includes a passive orifice design that remains clear, even under freeze-inducing ambient temperatures. The orifice permits the flow of humid gas under such sub-freezing conditions without the need for supplemental energy devices, thereby simplifying the overall design and reducing the cost, weight, size, reliability and system efficiency.

According to a first aspect of the invention, a cup-shaped device or component is formed into one or both of the anode flowpath and the cathode flowpath. In a particular configuration, the cup is shaped as a cone with an approximately 2 millimeter diameter orifice in the base. In one form, the wall thickness of such a cup is about 0.08 millimeters thick, and may be made of 1100-series aluminum. In a preferred form, the cup-shaped component is configured as an insert so that it can be rapidly inserted into an existing valve flowpath. In another preferred form, the orifice is volcano-shaped relative to the remainder of the component such that the edge of the orifice defines the initial point of passage of the reactant through the orifice.

A variation on this aspect includes a fuel cell system made up of—in addition to the aforementioned ice-resistant valve—one or more fuel cells. In situations where there are a plurality of such fuel cells, it will be appreciated that such cells may be arranged as a stack or related fuel cell assembly. Each cell is made up of an anode to accept a hydrogen-bearing reactant, a cathode to accept an oxygen-bearing reactant and a medium (such as the aforementioned Nafion™ (or the like) to form a PEM. Such a configuration promotes the delivery of at least a catalytically-ionized portion of the hydrogen-bearing reactant from the anode to the cathode. Additional components, such as an anode flowpath and a cathode flowpath help to deliver the reactants to the respective sides of the PEM. The valve is fluidly cooperative with one or both of the flowpaths to establish combination of a portion of the hydrogen-bearing reactant and the oxygen-bearing reactant. As with the previous aspect, the valve defines a fluid reactant passageway with a sharp-edged orifice that permits moisture contained within the reactant (whether hydrogen-bearing or oxygen-bearing to deposit on a surface portion of the fluid reactant passageway that is adjacent the orifice. In this way, the deposited moisture (which may be in droplet form) is conveyed away to be collected elsewhere such that upon exposure of the valve to environmental conditions where the moisture may be prone to freezing, such freezing will take place away from the orifice or other parts of the fluid reactant passageway.

According to another aspect of the invention, a method for starting a fuel cell system is provided. In one embodiment, the cup-shaped device is configured as an insert into the anode flowpath. This method could be applied to a cathode as well. By providing a clear path in a passive way, humid gas under freezing conditions may be delivered without the need for supplemental devices.

According to yet another aspect of the invention, a method for preventing blockage of a fuel cell system reactant flowpath is provided.

BRIEF DESCRIPTION OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
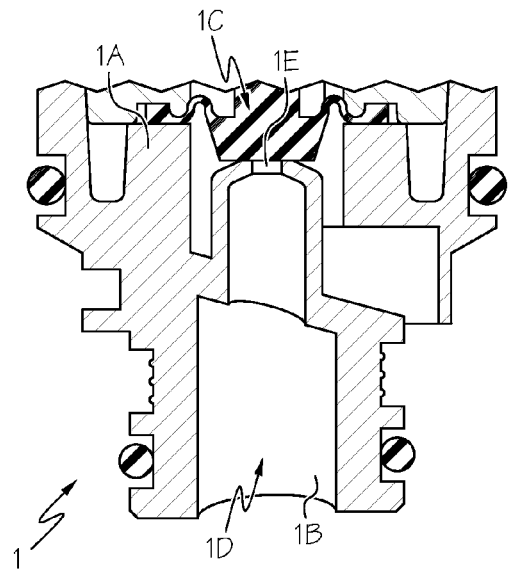
FIG. 1 is a cutaway view of a reactant flowpath according to the prior art where the orifice is prone to ice buildup.

Referring first to FIG. 1, a conventional valve 1 according to the prior art for use in a fuel cell system is disclosed. Valve 1 includes a valve body 1A that defines a fluid reactant passageway 1B therethrough such that the valve 1 may selectively allow passage of the reactant from the valve inlet 1C to the valve outlet 1D and then on to various components within the fuel cell system. An orifice 1E is integrally formed into the valve body 1A at either at the inlet (when the valve 1 is situated in a horizontal mount orientation) or as part of a poppet seat of the valve body 1A (as shown in FIG. 1). In one common configuration, the orifice is of a flat plate variety. Other devices that employ valves in conjunction with fluids exposed to freezing conditions (for example, a household refrigerator ice maker) will typically have the valve placed in a warm ambient environment, and will further typically use an open waterfall (rather than pipe) design to prevent ice blockage. Such a configuration is not available to fuel cell applications in general, and to automotive fuel cell applications in particular where the device with the valve and orifice may be expected to encounter freezing conditions (sometimes for protracted lengths of time), and may have to be in orientations that don't permit a ready disposal of the water that collects. In configurations where the valve 1 is configured for use in environments where freezing temperatures may be experienced, the relatively large thermal mass of the valve 1 (which is typically made of a dense metal such as iron or the like) makes it susceptible to ice formation and related blockage.

Figure 5:
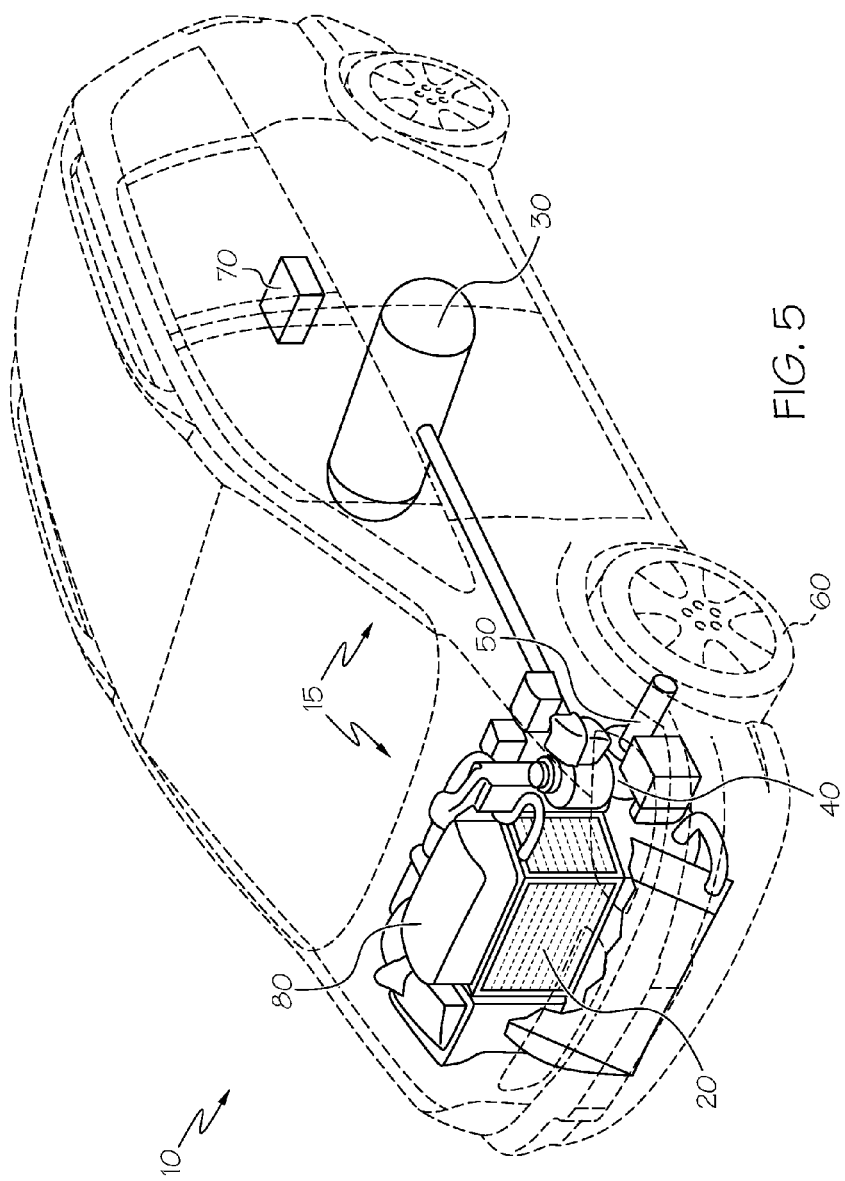
FIG. 5 is a cutaway view of an automobile employing a fuel cell system with the ice blockage-prevention features according to an aspect of the present invention.

Referring next to FIG. 5, the major components of a vehicle 10 and a fuel cell system 15 used to provide motive power to the vehicle 10 are shown. The system 15 includes one or more fuel cell stacks 20 that receive fuel from a fuel storage system 30 (made up of one or more fuel tanks) that are configured to contain a hydrogen-bearing reactant. Although not shown, an optional fuel processing system may also be used; such a system may include a conversion system (such as a methanation reactor or other such equipment known to those skilled in the art) to change a hydrogen-bearing precursor into a form suitable for catalytic reaction in the fuel cell stacks 20. It will also be appreciated by those skilled in the art that other fuel delivery and fuel processing systems are available. Likewise, the features of an air delivery system for the oxygen-bearing reactant may be disposed between an oxygen source (such as the ambient atmosphere) and the fuel cell stack 20. Such a system may include fluid delivery equipment in the form of conduit, valves, compressors, controllers or the like (none of which are shown). As will be appreciated by those skilled in the art, stack 20 is a repeating arrangement of numerous individual fuel cells such that the power output is sufficient to operate the drivetrain 50 through the energy conversion device 40 or other load.

Other features of vehicle 10 may include an energy conversion device 40 (for example, in the form of an electric motor that acts as a load for the current being generated by fuel cell system 15) coupled to a drivetrain 50 (such as a driveshaft or the like) and one or more motive devices 60, shown notionally as a wheel. Other ancillary equipment may include one or more batteries 70, as well as electronics 80 in the form of controllers or related system management hardware, software or combinations thereof. While the present system 10 is shown for mobile (such as vehicular) applications, it will be appreciated by those skilled in the art that the use of the fuel cell stack 20 and its ancillary equipment is equally applicable to stationary applications, such as stand-alone power generation equipment or the like.

Figure 2:
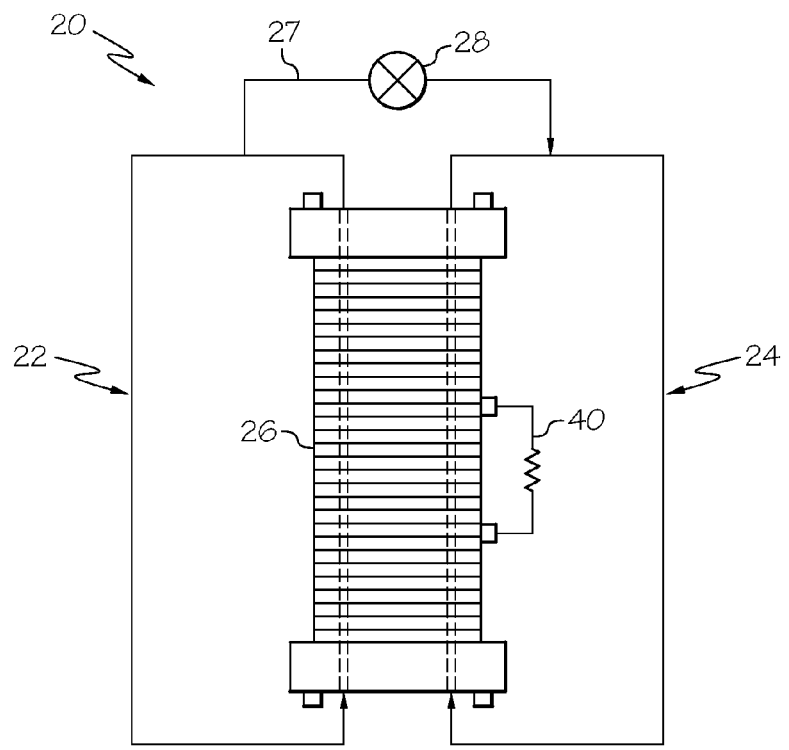
FIG. 2 shows the placement of a solenoid valve relative to a fuel cell stack for facilitating CCH during fuel cell cold starts and related ice blockage-prevention according to an aspect of the present invention.

Referring next to FIG. 2, the general configuration of a fuel cell stack 20 with a valve 28 used to permit selective combination of the anode and cathode reactants (such as for a CCSH event) is shown. Flow channels 22, 24 form the part of an anode flowpath and cathode flowpath that act as conduit for delivering reactants to the respective anodes and cathodes of the multiple fuel cells 26 in stack 20. In the present context, fluid-based passageways, streams, channels, conduit, loops, flowpaths and related terms may be used interchangeably to describe the conveyance of a fluid from one location to another; their meaning should be apparent from the context. In a preferred embodiment, the first reactant being routed through flow channel 22 is a hydrogen-bearing fluid (such as that contained within and delivered from fuel storage system 30), while the second reactant being routed through flow channel 24 is air or related oxygen-rich fluid. Each fuel cell 26 within stack 20 includes an anode, cathode and an electrolyte layer (none of which are shown) disposed between anode and cathode. A load (for example, in the form of a motor or related energy conversion device 40) is electrically coupled to stack 20 such that a current generated thereby may be used to perform useful work.

In one form, valve 28 may be formed in one of the flow channels 22, 24 of the respective reactants. In another form (as shown), a separate flow channel 27 may be coupled to both the flow channels 22, 24 to allow the selective combination, while valve 28 is used in either version to control when such combination is made. In one preferred (although not necessary) embodiment, valve 28 is a solenoid valve that can be powered through an appropriate electrical signal. The electrochemical combination of reactants made possible by valve 28 helps to reduce or eliminate the chance of flowpath ice formation; such an approach is particularly beneficial during fuel cell system 15 startup via CCSH or the like, as this catalytic reaction of the hydrogen and oxygen contained within the reactants produces heat that may be used to raise the temperature of adjacent flowpaths and components. In one form, valve 28 is allowed to remain open long enough (possibly for only a few seconds) to promote the desired combination and subsequent system warm-up via the catalytic reaction.

Figure 3:
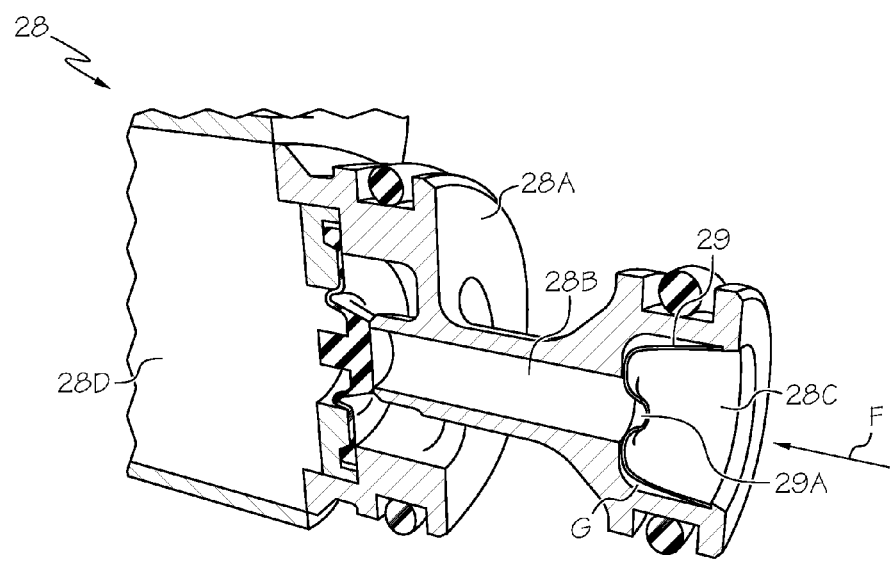
FIG. 3 is a cutaway view highlighting the placement of an insert into a reactant flowpath according to an aspect of the present invention.
Figure 4:
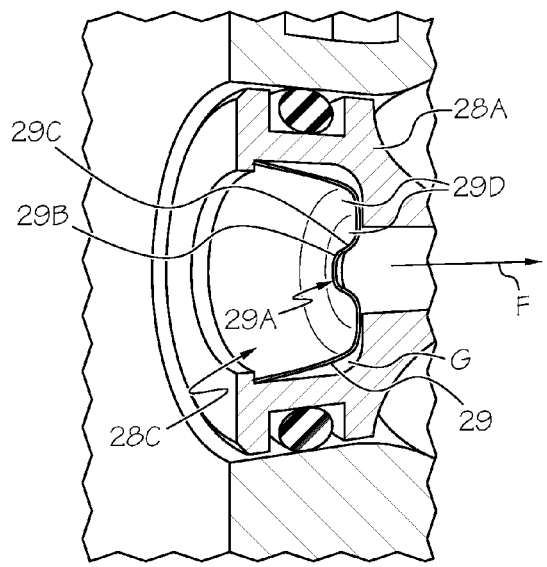
FIG. 4 is a cutaway view showing the insert of FIG. 3 in more detail.

Referring next to FIGS. 3 and 4, additional details of the construction of valve 28 are shown. As discussed herein, in one form, valve 28 may be configured as a solenoid valve, where an electric current passing through wrapped coil (not shown) can force a magnetically-compliant (for example, iron-based) actuator or related plunger (not shown) to move a flap or related closure mechanism (not shown) in valve 28 in order to regulate the flow of reactant therethrough. Valve body 28A forms the primary structure, through which a bore forming a fluid reactant passageway 28B is defined. An inlet 28C and an outlet 28D are at respective ends of fluid reactant passageway 28B.

A cup-shaped insert 29 is sized to fit within an enlarged region within the inlet 28C. In one form, the insert 29 defines a slight inward taper along the reactant flow direction F. Furthermore, the insert 29 defines a generally smooth path with gradual (rather than abrupt) surface contour changes. Such shaping helps to promote a continuous flow of a fluid (as well as moisture contained within or separated from) to a desired location for collection or additional downstream movement. In one form, the insert 29 is made of an inexpensive material (for example, an aluminum or aluminum alloy) that can be stamped or otherwise formed in a cost-efficient way to define a passive path for the reactant to flow through. Other manufacturing approaches may be used as well, so long as the surface finish remains very smooth to create a hydrophillic surface that avoids droplet formation and buildup, as well as and keeping the wall thickness very thin (for example, to the thickness mentioned above) to promote rapid warm-up. Thus, while machining the piece and then subjecting it to electropolishing would work, such a method would be cost prohibitive. In a preferred form, the roughness is below a suitable profile or area value as determined by suitable AMSE (for example, ASME Y14.36M), ANSI, ISO (for example, ISO 1302) or related standard. In a more preferred form, such values are an $R_z$ of about 10 and an $R_t$ of about 12. Moreover, the upper rim of the insert 29 is sized to allow a secure snap-fit connection between the insert 29 and a lip on the compatibly-sized and shaped region within the inlet 28C. An orifice 29A forms a flow-regulating opening, preferably with a precisely known size to provide a calibrated or measured amount of the fluid flow from a pressure drop that occurs as the fluid passes through it. While the orifice 29A performs valuable flow or control functions, the very size, shape, orientation and precision needed to establish its flow-regulating function also make it particularly susceptible to the types of ice blockage associated with the remainder of the valve 28. To alleviate the tendency of having water droplets form on—and remain in the vicinity of—the orifice 29A, the present inventors shaped it to define an upwardly-projecting edge (or lip) 29B around its periphery such that it defines a generally three-dimensional structure. In one preferred form, the orifice 29A and edge 29B define a volcano-like profile, where the raised edge 29B is the first part of the orifice 29A that the incoming flow or reactant encounters along flow direction F. The edge 29B is preferably very thin, which promotes instability of any water that contacts it. Likewise, the volcano-like shape of the insert 29 enhances capillary driven flow of water from the orifice 29A, as a droplet at the peak of the volcano (i.e., at the edge 29B) is highly unstable. As such, by the present construction of insert 29—with its use of a thin metallic configuration and sharp edge 29B—introduces instability in the water drops by maximizing gas/liquid surface area in a manner generally analogous to putting a drop of water on a needle tip. This condition can be remedied by moving the water droplets to other more energy-compatible surfaces that include a gutter 29C and corner 29D that are shaped to provide a smooth transition away from the unstable edge 29B that make up the insert 29. In this way, the use of the contoured features discussed above in insert 29 helps avoid the droplets of water that condense out of the reactant in the immediate vicinity about orifice 29A from remaining there and turning into ice in freezing conditions. Instead, the present insert 29 minimizes surface energy of the condensed droplets by having them collect in locations that reduce the gas/liquid surface area in what is known as the Concus-Finn condition. The surface energy described thereby is also important for describing capillary motion toward such low-energy geometries. This configuration (with its use of smooth, gradual surface changes) promotes neutral surface energy; such promotion is enhanced through the avoidance of machining marks, pitting, waviness or other related undulations along the insert 29 surface that would otherwise fill with water and undesirably change the surface energy (in essence making it become more hydrophilic) for larger drops of water. Further rationale for avoiding or minimizing surface marks is because such marks could also promote capillary movement toward the orifice 29A. By promoting a neutral surface energy, the present inventors realized that they could discourage the formation of a hydrophilic surface (and the concomitant spillage of water over the orifice 29A). Similarly, the promotion of a neutral surface would discourage the formation of the opposite (i.e., a hydrophobic surface) that would otherwise tend to reduce capillary motion of the water toward, and retention in, the corner 29D.

A gap G is formed between the tapered portion of the insert 29 and the inner wall of the region within the inlet 28C. In a preferred form (as shown with particularity in FIGS. 3 and 4), the valve 28 is horizontally mounted. In this way, water droplets that form on one side or surface of the insert 29 drain around the sharp edge 29B and into gutter 29C and corner 29C, while the water droplets that form on the other side or surface of the insert 29 drain along the gradual outer contour formed by gutter 29C to collect in gap G. From here, any accumulated liquid would either get absorbed into the gas flowing through the valve 28, or accumulate until it ran over the lip formed at the inlet junction between the insert 29 and valve 28 and then down the face of the component that valve 28 is installed in.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component. Likewise, it is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. An ice-resistant valve for use in a fuel cell system, said valve comprising:
    a fluid inlet configured to receive a fuel cell reactant;
    a fluid outlet disposed fluidly downstream of said fluid inlet; and
    a body defining a fluid reactant passageway therethrough that is cooperative with said fluid inlet and said fluid outlet, at least one of said fluid reactant passageway, said fluid inlet and said fluid outlet defining an orifice therein that is configured with at least one edge such that at least a portion of moisture contained within said fuel cell reactant that deposits on said edge is conveyed from said orifice in environmental conditions where said deposited moisture may be prone to freezing in order to have such freezing take place away from said orifice to prevent ice blockage thereto, said orifice defining a gutter formed outwardly adjacent said at least one edge and a corner formed outwardly adjacent said gutter such that at least a portion of said deposited moisture that forms on said at least one edge is conveyed toward said gutter and said corner.

2. The valve of claim 1, wherein said at least one edge defines a leading edge of said orifice relative to a travel path defined by said fuel cell reactant.

3. The valve of claim 1, wherein said orifice defined in said fluid inlet is formed as part of a separate insert disposed within at least one of said fluid reactant passageway, said fluid inlet and said fluid outlet.

4. The valve of claim 3, wherein said separate insert is made from an aluminum-based material.

5. The valve of claim 3, wherein said valve is oriented in said fuel cell system such that during normal operation thereof, the portion of said fluid reactant passageway that contains said orifice is oriented in a substantially horizontal dimension such that moisture collecting on said at least one edge drains away from said orifice along said gutter to a collection location within said insert.

6. The valve of claim 1, wherein said valve avoids the use of a heating device or vibratory movement to facilitate such prevention of ice blockage.

7. The valve of claim 1, wherein at least a portion of said fluid reactant passageway comprises at least one enhancement to its surface to increase its hydrophilic properties.

8. A method of inhibiting freeze-related blockage of a reactant flowpath in an automotive fuel cell system, said method comprising:
    configuring a valve to be fluidly cooperative with said reactant flowpath, said valve defining a fluid reactant passageway therethrough, at least a portion of said valve defining an orifice therein that is configured with at least one edge;
    passing at least one of a hydrogen-bearing reactant and an oxygen-bearing reactant through said valve in environmental conditions where moisture present in said at least one reactant may be prone to freezing such that at least a portion of said moisture forms unstable water droplets on said at least one edge; and
    conveying said formed water droplets away from said orifice in order to have such freezing take place in such a location as to not impede flow of said at least one reactant through said orifice.

9. The method of claim 8, further comprising configuring said portion of said valve that defines said orifice therein to further comprise a gutter formed around a periphery of said at least one edge such that at least a portion of said droplets on said edge that are conveyed away from said orifice proceed toward said gutter.

10. The method of claim 9, further comprising configuring said portion of said valve that defines said orifice therein to comprise a corner formed around a periphery of said gutter such that at least a portion of said droplets that are conveyed away from said orifice proceed toward said corner.

11. The method of claim 10, wherein said orifice is formed as part of a separate insert disposed within said valve.

12. The method of claim 8, wherein said orifice is formed as part of a separate insert disposed within said valve.

13. A method of promoting cold catalytic heating during a fuel cell stack cold start in an environmental condition where moisture present in a reactant flowstream may be prone to freezing, said method comprising:
    passing at least one of a hydrogen-bearing reactant and an oxygen-bearing reactant through a valve such that at least a portion of said moisture contained in said at least one reactant forms unstable water droplets on at least one edge of an orifice that defines a fluid reactant passageway in said valve;
    conveying said formed water droplets away from said orifice in order to have such freezing take place in such a location as to not impede passage the flow of said at least one reactant through said orifice;
    combining said hydrogen-bearing reactant and said oxygen-bearing reactant in an electrochemical reaction such that a catalytic generation of heat takes place; and
    using said catalytic generation of heat to increase the temperature of at least a portion of said stack.

14. The method of claim 13, wherein a region surrounding said orifice comprises a gutter formed around a periphery of said at least one edge and a corner formed around a periphery of said gutter such that at least a portion of said conveyed water droplets proceed toward said corner past said gutter.

15. The method of claim 14, wherein said orifice is formed as part of a separate insert disposed within said valve, said separate insert configured to define a gap between an outer surface thereof and an adjacent inner surface of said valve such that at least a portion of said conveyed water droplets pass into said gap.

16. The method of claim 13, wherein said orifice and said at least one edge define a substantially axisymmetric profile with a diameter of about 2 millimeters.

17. The method of claim 16, wherein said orifice and said at least one edge define a substantially volcanic-shaped profile.

18. A fuel cell stack comprising:
    a plurality of fuel cells arranged along a stacking direction, each of said cells comprising an anode portion, an anode flowpath configured to fluidly couple said anode portion to a fuel source reactant, a cathode portion, a cathode flowpath configured to fluidly couple said cathode portion to an oxygen source reactant, and a proton-transmissive electrolyte disposed between said anode portion and said cathode portion; and
    a cold catalytic heating valve placed in fluid cooperation with at least one of said anode and cathode flowpaths, said valve comprising;
        a fluid inlet configured to receive a respective one of said (a) fuel source reactant and oxygen source reactant;
        a fluid outlet disposed fluidly downstream of said fluid inlet; and
        a body defining a fluid reactant passageway therethrough that is cooperative with said fluid inlet and said fluid outlet, at least one of said fluid reactant passageway, said fluid inlet and said fluid outlet defining an orifice therein that is configured with at least one edge such that at least a portion of moisture contained within said respective reactant that deposits on said edge is conveyed from said orifice in environmental conditions where said deposited moisture may be prone to freezing in order to have such freezing take place away from said orifice to prevent ice blockage thereto.

19. The stack of claim 18, wherein said orifice defines a gutter formed outwardly adjacent said at least one edge and a corner formed outwardly adjacent said gutter such that at least a portion of said deposited moisture that forms on said at least one edge is conveyed toward said gutter and said corner.

20. The stack of claim 18, wherein said orifice is formed as part of a separate insert disposed within said valve.

* * * * *